(12) United States Patent
Cox et al.

(10) Patent No.: US 11,142,151 B2
(45) Date of Patent: Oct. 12, 2021

(54) PRIORITIZATION OF ELECTRIC VEHICLE POWER DISTRIBUTION

(71) Applicant: Ford Global Technologies, LLC, Dearborn, MI (US)

(72) Inventors: David Cox, London (GB); Themi Petridis, Bishop's Stortford (GB)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/738,207

(22) Filed: Jan. 9, 2020

(65) Prior Publication Data

US 2021/0213896 A1    Jul. 15, 2021

(51) Int. Cl.
*B60R 16/03*    (2006.01)

(52) U.S. Cl.
CPC .................................. *B60R 16/03* (2013.01)

(58) Field of Classification Search
None
See application file for complete search history.

(56) References Cited

U.S. PATENT DOCUMENTS

| | | |
|---|---|---|
| 6,718,214 B1 | 4/2004 | Schoettle et al. |
| 7,173,347 B2 | 2/2007 | Tani et al. |
| 7,948,113 B2 | 5/2011 | Abe |
| 10,015,927 B2 | 7/2018 | Fritz et al. |
| 2007/0241614 A1* | 10/2007 | Busdiecker ............... H02J 1/14 307/10.1 |

* cited by examiner

*Primary Examiner* — Cassandra F Cox
(74) *Attorney, Agent, or Firm* — Burr & Forman, LLP

(57) ABSTRACT

A power management system for a vehicle includes a high voltage power source configured to provide power to vehicle subsystems, and at least one control module operably coupled to the high voltage power source and configured to receive power demand requests from the vehicle subsystems, and prioritize supply of power from the high voltage power source based on an assigned priority associated with each of the received power demand requests. The assigned priority may vary based on vehicle status.

18 Claims, 3 Drawing Sheets

PRIORITIZATION OF ELECTRIC VEHICLE POWER DISTRIBUTION

TECHNICAL FIELD

Example embodiments generally relate to electrified vehicle power systems and, more particularly, relate to systems and methods for prioritizing power distribution in an electrified vehicle.

BACKGROUND

Multiple systems in an electrified vehicle depend on a power supplied by a high voltage power source, such as a battery. As such, these vehicle systems may compete for power in certain conditions.

In general, a vehicle battery can support a reasonable level of transient power demand, but should be able to sustain continuous electrical power to the electric motor by itself if so required. This issue may be more pronounced in so called mild-HEVs which have a smaller 48V battery than full hybrid batteries, and therefore the battery alone in a mild hybrid may not be able to deliver a constant power output in certain conditions. Thus, strategies for prioritizing power distribution may be needed.

BRIEF SUMMARY OF SOME EXAMPLES

In accordance with an example embodiment, a power management system for a vehicle is provided. The power management system may include a high voltage power source configured to provide power to vehicle subsystems, and at least one control module operably coupled to the high voltage power source and configured to receive power demand requests from the vehicle subsystems, and prioritize supply of power from the high voltage power source based on an assigned priority associated with each of the received power demand requests. The assigned priority may vary based on vehicle status.

In another example embodiment, a control module for a power management system for a vehicle is provided. The power management system may include a high voltage power source configured to provide power to vehicle subsystems. The control module may include processing circuitry configured to receive power demand requests from respective ones of the vehicle subsystems, and prioritize power supply from the high voltage power source based on an assigned priority associated with each of the received power demand requests. The assigned priority includes a priority designation associated with at least one closed loop subsystem, at least one open loop subsystem, at least one high voltage subsystem, and at least one low voltage subsystem.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
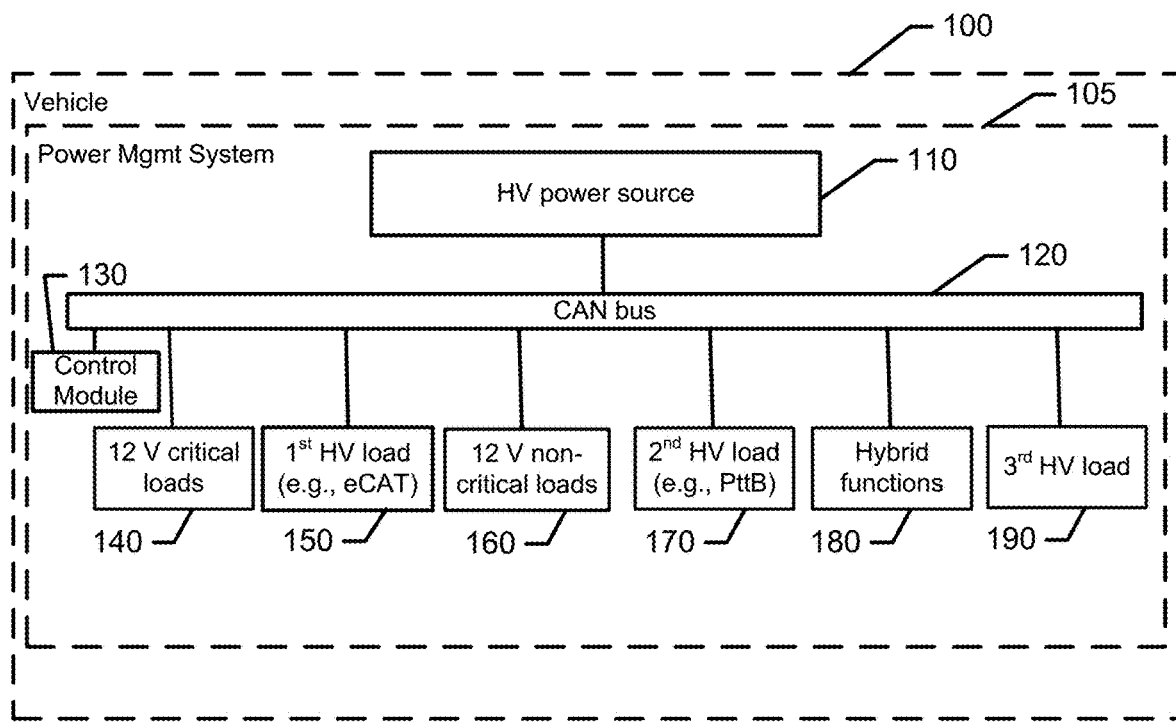
FIG. 1 illustrates a block diagram of a power management system of a hybrid vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide an improved system for managing consumer demand in a hybrid vehicle. In this regard, example embodiments may enable the vehicle to intelligently select, based on predefined priorities, how to manage requests for power (i.e., demand). The prioritization may be configured to ensure that there is support for critical vehicle functions at all times. Thus, although some functions may be inhibited for periods of time where demand exceeds maximum capabilities, those periods of inhibited operation can generally be minimized and, in any case, such inhibited functions would only be non-critical functions. Some examples of components and structures that can be employed in order to implement example embodiments will be discussed below.

FIG. 1 illustrates a block diagram of a vehicle 100 (e.g., a hybrid electric vehicle) of an example embodiment. As shown in FIG. 1, the vehicle 100 may include a power management system 105 that may include a high voltage power source 110, which may include a battery unit and generator, and various loads associated with respective subsystems and/or components connected thereto. The battery unit of the high voltage power source 110 may, for example, have a rated voltage in the range of about 100V to 200V. However, other ratings and capacities are also possible. Moreover, in the following example, the battery unit may be a 48V battery. Thus, in the context of this disclosure, the term "high voltage" should be understood to include voltages greater than 12V (e.g., 24V, 48V and over 100V). In a typical situation, the loads/subsystems may be operably coupled to the high voltage power source 110 via respective power connections and/or via a power bus. However, for communication purposes, the loads/subsystems may also be operably coupled to the high voltage power source 110 via a communication bus such as a controller area network (CAN) bus 120. The CAN bus 120 is configured to operate in accordance with a standard or protocol that enables microcontrollers or processors of various systems, components or subsystems to communicate with each other within the vehicle 100 without a central processor (or host). Thus, a control module 130 is shown in FIG. 1 and may be operably coupled to the CAN bus 120 to handle requests for power that are communicated in association with loads corresponding to the control module 130. As such, it should be understood that the control module 130 represents one example of a processing device that may be duplicated numerous times for respective different loads or subsystems including those described below. In an example embodiment, the control module 130 may employ intelligence with respect to the employment of strategies for prioritizing the fulfillment of the requests received, where the strategy is embodied by how requests for power are prioritized and handled.

Such prioritization may be particularly useful in light of more recent trends toward including certain high power loads on hybrid vehicles or functions for supporting external high power loads on hybrid vehicles. In this regard, high voltage subsystems where the end consumer is at 48V are a relatively new addition to the more familiar low voltage subsystems at 12V. The ability to prioritize these distinct subsystems, particularly when some subsystems are open loop and others are closed loop, may enable engineers to avoid unnecessary costs associated with overdesigning the electric vehicle system components.

FIG. 1 also illustrates examples of loads/subsystems that may have one or more respective instances of the control module 130 associated therewith and to and from which power requests that get routed via a corresponding instance of the control module 130. In this regard, for example, 12V critical loads 140, a first high voltage load (e.g., an electronic catalyst (eCAT) 150, 12V non-critical loads 160, a second high voltage load (e.g., power-to-the-box (PttB) 170), hybrid functions 180, a third high voltage load 190, and various other loads could be operably coupled to the high voltage power source 110 via the CAN bus 120. Although other loads/subsystems may also be provided, most of the loads/subsystems on the CAN bus 120 can be classified as either high voltage subsystems (e.g., 48V loads) or low voltage subsystems (e.g., 12V loads). Moreover, loads/subsystems could further be classified as being open loop, where no user input is required (or used) for operation, or as being closed loop, where user input is required.

The eCAT 150 may, for example, be a high voltage subsystem (e.g., a 48V load) and may include an electronically heated catalyzer that operates to reduce vehicle emissions when the engine is running (e.g., when the engine/after-treatment system is cold or when the battery unit of the high voltage power source 110 lacks sufficient charge to power the motor of the vehicle 100). The eCAT 150 is an important component for enabling emissions requirements to be met by the vehicle 100. Although a system of employing post-injection modes of operation may be possible in order to reduce emissions, post-injection modes are generally known to degrade oil more quickly. Thus, the eCAT 150 may be not only important, but the preferred way of meeting emissions standards for some vehicles. As such, the eCAT 150 could be considered vital under certain circumstances. The eCAT 150 is also an example of a closed loop subsystem or load. The eCAT 150 generally operates when the engine is running, but may sometimes be preheated to increase effectiveness early in a run cycle.

The PttB 170 may be another high voltage subsystem (e.g., a 48V load), but may have low power and high power modes that can be selected by the user. Moreover, enabling PttB 170 at all may require user input in some cases. Thus, the PttB 170 may be considered to be an open loop subsystem or load. In an example embodiment, external loads such as laptops, phone chargers, power tools, camping gear, drone chargers, or the like may be powered via PttB 170. The PttB 170 may supply power to various devices using various types of receptacles (e.g., USB, 110V-60 Hz, etc.). Thus, the PttB 170 may include DC to DC converters, DC to AC converters, AC to DC converters and/or the like to support such functionality for each respective type of receptacle that is to be powered. In some cases, a mobile office or relatively large loads could be powered via the PttB 170.

The 12V critical loads 140 may include power steering, vehicular operation-related functions and/or the like. 12V non-critical loads 160 may include navigation systems, heated seats, power seats, radio, media players, and other accessory-type loads or subsystems. PttB 170 is an external power supply, which could include internal (i.e., in-cabin) power receptacles or external power receptacles that power external loads of various sizes. The hybrid functions 180 may include specific functions associated with hybrid vehicles. For example, the hybrid functions 180 may include torque substitution, regenerative braking, etc.

As noted above, any or all of the 12V critical loads 140, eCAT 150, 12V non-critical loads 160, PttB 170, hybrid functions 180, and various other loads may make power requests at a given time. Each of these requests is generally broadcast over the CAN bus 120 to the control module 130 and other control modules associated with respective subsystems or components on the CAN bus 120. Based on the power requests received from each consumer or load, the control module 130 may apply a prioritization schedule or ranking to the requests in order to assign a priority to each request. The requests may then be fulfilled in priority order up until capacity of a capacity for request fulfillment is reached. The capacity for request fulfillment and/or the priorities (and methodology for assigning such priorities) may change depending on the current operational situation or conditions of the vehicle 100.

The prioritization schedule or ranking system described above may be executed based on ranking of subsystems by priority. In an example embodiment, an assigned priority may be defined for each different class of loads or subsystems. The assigned priority may include a priority designation that is recognized within the protocol employed on the CAN bus 120 so that requests from respective subsystems include the priority designation associated with their class and can be recognized by the control module 130. Within this paradigm, priority designations that are higher in priority get requests fulfilled before those with lower priority designations. Thus, power demand request fulfillment may then be accomplished based on a rank ordering of the requests by priority.

In accordance with an example embodiment, a primary prioritization order from highest to lowest rank may define the 12V critical loads 140 as having the highest priority designation. The eCAT 150 may have the next highest priority designation and be followed by the 12V non-critical loads 160. The PttB 170 may have the next highest priority designation and be followed by the hybrid functions 180, which may have the lowest priority designation. This primary prioritization could be utilized as the default or normal ordering of the assigned priority.

As an example, during a cold start after soak, the user may wish to use the PttB 170 immediately. However, the 12V critical loads 140 demand during cold start is likely to be high, and it is likely that the eCAT 150 will be required to support emissions reduction efforts. Accordingly, the strategy employed by the primary prioritization listed above may be to prioritize the 12V critical loads 140 and the eCAT 150 over the PttB 170. As such, the PttB 170 may be inhibited until either there is a demand reduction from the 12V critical loads 140, or the eCAT 150 is no longer active.

However, if the vehicle 100 were to remain parked so that the PttB 170 could be used to power a mobile office, then the otherwise critical functions associated with keeping the vehicle operational that are included in the 12V critical loads 140 may not be required. Thus, the operational status of the vehicle 100 may be used to alter or inform the prioritization in some cases. As noted above, the PttB 170 may have multiple modes. In a low power mode, the PttB 170 may have a maximum capacity for supplying external loads that is set as a fraction (e.g., ½, ⅓, ⅔) of the capacity for supplying external loads that is provided for a high power mode. Accordingly, in some cases, implementation of the high power mode may be restricted based on operational conditions or vehicle status (e.g., a driving status or parked status). Thus, for example, low power mode (e.g., for powering smaller devices such as laptops, cell phone chargers, etc.) may be the default mode when PttB 170 operation is selected and may be available at any time, but at a lower priority. Meanwhile, high power mode may be restricted to only being available after a predefined period of time after the vehicle 100 is started (e.g., to avoid conflict with other large loads (e.g., eCAT 150) that operate with a heavy load near vehicle start).

Alternatively or additionally, the high power mode may be restricted to operations only when the vehicle status is parked. In this regard, the high power mode, which can power a mobile office or multiple large loads, may not be expected or needed to be operational when the vehicle 100 is being driven. However, if the high power mode is only selectable when the vehicle 100 is parked, then it can be assumed that the provision of power to external loads via the PttB 170 is important to the user. Thus, although the system may default to the low power mode, which has a low priority under the default or primary prioritization order, the PttB 170 could ascend in priority when the vehicle 100 is parked. This may be one example of a situation where the specific application involved can have a changed priority based on operational conditions, the application, or vehicle status. In this regard, instead of utilizing the primary prioritization order defined above, a secondary prioritization order may be defined in which the PttB 170 ascends within the ranking structure (specifically based on user input and vehicle status) in order to be ranked higher than one or more of the subsystems otherwise ranked ahead of the PttB 170 in the primary prioritization order.

Moreover, the prioritizations could be calibrated so that strategies can be developed and adapted over time to be optimized for given vehicle applications or conditions. For example, the eCAT 150 may get dirty or experience degradation over time, which may cause the eCAT 150 to draw a higher load as time progresses. The prioritizations could be modified or adapted to account for the increased load drawn over time. As discussed above, one example listing of priorities may be as follows:
1. Critical 12Vs and 48V Battery charge if state of charge is low;
2. Emissions (e.g. eCAT);
3. External power supply (e.g. PttB);
4. Convenience 12V loads; and
5. Hybrid Functionality (Torque Substitution and or Transient Torque Supplementation).

Figure 2:
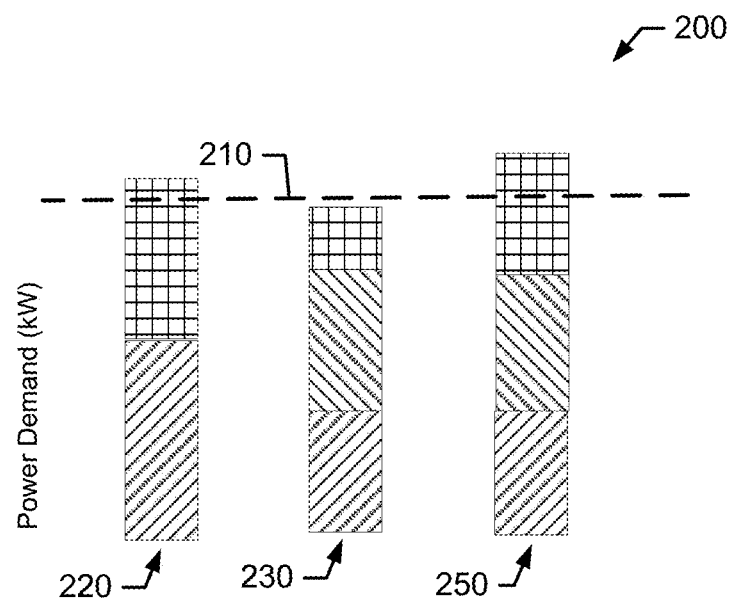
FIG. 2 illustrates a chart showing power demands for various use cases in accordance with an example embodiment.

FIG. 2 is a chart 200 showing power demand in various use cases. In this regard, a power specification line 210 is shown on the chart 200 along with the maximum power draw from various subsystems under certain conditions. As can be seen in FIG. 2, during a cold start and idle (which may be expected to last for about 300 seconds) condition 220, the maximum demand from eCAT and 12V loads consume the entire capability of the system by themselves. Thus, there is no possibility to support PttB in this use case.

Meanwhile, during steady state driving conditions 230, PttB can also be supported. However, when after-treatment (AT) temperature control is employed by the eCAT in use case 250, the worst case power draws exceed specification due to a relatively large high voltage subsystem (48V) demand. By employing a prioritization strategy as described herein, the 700 W difference between the worst case situation of use case 250 can be managed.

Figure 3:
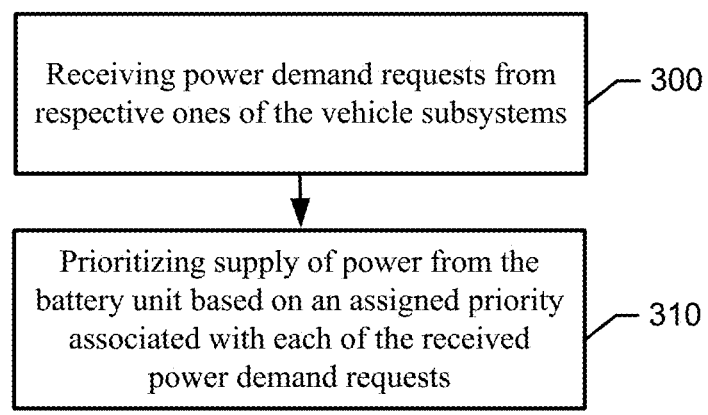
FIG. 3 is a block diagram showing a method of operation of a control module for prioritized power management in accordance with an example embodiment.

FIG. 3 is a block diagram showing a method of operation of a control module for prioritized power management in accordance with an example embodiment. In this regard, the control module may include processing circuitry configured to perform at least operations 300 and 310 below. Operation 300 may include receiving power demand requests from respective ones of the vehicle subsystems. Operation 310 may include prioritizing supply of power from the high voltage power source based on an assigned priority associated with each of the received power demand requests. The assigned priority includes a priority designation associated with at least one closed loop subsystem, at least one open loop subsystem, at least one high voltage subsystem, and at least one low voltage subsystem. The assigned priority is changeable based on vehicle status.

Accordingly, some example embodiments may provide a power management system for a hybrid vehicle. The power management system may include a high voltage power source configured to provide power to vehicle subsystems, and at least one control module operably coupled to the high voltage power source and configured to receive power demand requests from the vehicle subsystems, and prioritize supply of power from the high voltage power source based on an assigned priority associated with each of the received power demand requests. The assigned priority may be changeable based on vehicle status and includes a priority designation associated with at least one of a closed loop subsystem, an open loop subsystem, a high voltage subsystem, and a low voltage subsystem.

The power management system (or processing circuitry included in or otherwise defining the control module) of some embodiments may include additional features, modifications, augmentations and/or the like to achieve further objectives or enhance operation. The additional features, modifications, augmentations and/or the like may be added in any combination with each other. Below is a list of various additional features, modifications, and augmentations that can each be added individually or in any combination with each other. For example, the system may further include a plurality of loads associated with respective ones of the vehicle subsystems, and a communication bus to which the high voltage power source is operably coupled and via which requests for power from the high voltage power source are managed. In some cases, the assigned priority may include a primary prioritization order from highest to lowest rank comprising low voltage subsystem critical loads, a high voltage subsystem emissions control load, low voltage subsystem non-critical loads, a high voltage subsystem external power source, and low voltage subsystem hybrid functions. In an example embodiment, the primary prioritization order may be assigned when the vehicle status is a driving status. In some cases, the assigned priority may include a secondary prioritization order in which the high voltage subsystem external power source has a higher rank than one or more of the low voltage subsystem critical loads, a high voltage subsystem emissions control load, low voltage subsystem non-critical loads. In an example embodiment, the secondary prioritization order may be employed in response to user selection of a high power mode associated with the high voltage subsystem external power source. In some cases, the user selection of the high power mode may be only enabled when the vehicle status is a parked status. In an example embodiment, the user selection of the high power mode may not be available during vehicle warmup or within a predetermined time after starting the vehicle. In some cases, the high voltage subsystem external power source may have a low power mode and a high power mode. Power demand requests made in the high power mode may have a different priority than power demand requests made in the low power mode. In an example embodiment, the at least one closed loop subsystem may include an electronically heated catalyst (eCAT) that is an instance of the high voltage subsystem, and the open loop subsystem may include a power-to-the-box feature that is another instance of the high voltage subsystem. In some cases, the low voltage subsystem may include or be embodied as 12V critical loads, 12V non-critical loads, and/or loads associated with hybrid functions. In an example embodiment, the high voltage subsystem may be a 48V end consumer, and the low voltage subsystem may be a 12V end consumer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A power management system for a vehicle, the power management system comprising:
    a high voltage power source configured to provide power to vehicle subsystems; and
    at least one control module operably coupled to the high voltage power source and configured to:
    receive power demand requests from the vehicle subsystems, and
    prioritize supply of power from the high voltage power source based on an assigned priority associated with each of the received power demand requests,
    wherein the assigned priority varies based on vehicle status;
    wherein the power management system further comprises a plurality of loads associated with respective ones of the vehicle subsystems, and a communication bus to which the high voltage power source is operably coupled and via which requests for power from the high voltage power source are managed;
    wherein the assigned priority includes a priority designation associated with at least one of a closed loop subsystem, an open loop subsystem, a high voltage subsystem, and a low voltage subsystem; and
    wherein the assigned priority includes a primary prioritization order from highest to lowest rank comprising: low voltage subsystem critical loads, a high voltage subsystem emissions control load, low voltage subsystem non-critical loads, a high voltage subsystem external power source, and low voltage subsystem hybrid functions.

2. The power management system of claim 1, wherein the primary prioritization order is assigned when the vehicle status is a driving status.

3. The power management system of claim 1, wherein the assigned priority includes a secondary prioritization order in which the high voltage subsystem external power source has a higher rank than one or more of the low voltage subsystem critical loads, a high voltage subsystem emissions control load, low voltage subsystem non-critical loads.

4. The power management system of claim 3, wherein the secondary prioritization order is employed in response to user selection of a high power mode associated with the high voltage subsystem external power source.

5. The power management system of claim 4, wherein the user selection of the high power mode is only enabled when the vehicle status is a parked status.

6. The power management system of claim 4, wherein the user selection of the high power mode is not available during vehicle warmup or within a predetermined time after starting the vehicle.

7. The power management system of claim 1, wherein the high voltage subsystem external power source has a low power mode and a high power mode,
    wherein power demand requests made in the high power mode have a different priority than power demand requests made in the low power mode.

8. The power management system of claim 1, wherein the closed loop subsystem comprises an electronic catalyzer that is also an instance of the high voltage subsystem, and
    wherein the open loop subsystem comprises a power-to-the-box feature that is another instance of the high voltage subsystem.

9. The power management system of claim 8, wherein the low voltage subsystem comprises:
    12V critical loads;
    12V non-critical loads; and
    hybrid functions.

10. The power management system of claim 1, wherein the high voltage subsystem comprises a 48V end consumer, and wherein the low voltage subsystem comprises a 12V end consumer.

11. A control module for a power management system for a hybrid vehicle, the power management system comprising a high voltage power source configured to provide power to vehicle subsystems, the control module comprising processing circuitry configured to:
    receive power demand requests from respective ones of the vehicle subsystems, and
    prioritize supply of power from the high voltage power source based on an assigned priority associated with each of the received power demand requests,
    wherein the assigned priority includes a priority designation associated with at least one of a closed loop subsystem, an open loop subsystem, a high voltage subsystem, and a low voltage subsystem;

wherein the assigned priority is changeable and includes a primary prioritization order from highest to lowest rank comprising: low voltage subsystem critical loads, a high voltage subsystem emissions control load, low voltage subsystem non-critical loads, a high voltage subsystem external power source, and low voltage subsystem hybrid functions.

12. The control module of claim 11, wherein the primary prioritization order is assigned when the vehicle status is a driving status.

13. The control module of claim 11, wherein the assigned priority includes a secondary prioritization order in which the high voltage subsystem external power source has a higher rank than one or more of the low voltage subsystem critical loads, a high voltage subsystem emissions control load, low voltage subsystem non-critical loads.

14. The control module of claim 13, wherein the secondary prioritization order is employed in response to user selection of a high power mode associated with the high voltage subsystem external power source.

15. The control module of claim 14, wherein the user selection of the high power mode is only enabled when the vehicle status is a parked status.

16. The control module of claim 14, wherein the user selection of the high power mode is not available during vehicle warmup or within a predetermined time after starting the vehicle.

17. The control module of claim 11, wherein the high voltage subsystem external power source has a low power mode and a high power mode, wherein power demand requests made in the high power mode have a different priority than power demand requests made in the low power mode.

18. The control module of claim 11, wherein the closed loop subsystem comprises an electronically heated catalyst (eCAT) that is also an instance of the high voltage sub system, wherein the open loop subsystem comprises a power-to-the-box feature that is another instance of the high voltage subsystem, and wherein the low voltage subsystem comprises:

12V critical loads;

12V non-critical loads; and hybrid functions.

* * * * *